(12) United States Patent
Young, Jr. et al.

(10) Patent No.: US 12,536,266 B2
(45) Date of Patent: Jan. 27, 2026

(54) SYSTEMS AND METHODS FOR CONTENT SELECTIONS FOR SECURING COMMUNICATIONS BETWEEN AGENT DEVICES AND USER DEVICES

(71) Applicant: Capital One Services, LLC, McLean, VA (US)

(72) Inventors: Michael Anthony Young, Jr., McLean, VA (US); Matthew Louis Nowak, McLean, VA (US); Christopher McDaniel, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 322 days.

(21) Appl. No.: 18/334,071

(22) Filed: Jun. 13, 2023

(65) Prior Publication Data
US 2024/0419772 A1    Dec. 19, 2024

(51) Int. Cl.
*G06F 21/36* (2013.01)
(52) U.S. Cl.
CPC .................................. *G06F 21/36* (2013.01)
(58) Field of Classification Search
CPC ....................................................... G06F 21/36
See application file for complete search history.

(56) References Cited

U.S. PATENT DOCUMENTS

| | | | |
|---|---|---|---|
| 9,705,999 B1 | 7/2017 | Lewis et al. | |
| 9,792,366 B2 | 10/2017 | Macadaan et al. | |
| 9,948,639 B2* | 4/2018 | Jeon | H04L 63/0853 |
| 11,374,915 B1* | 6/2022 | Munsell | H04L 63/10 |
| 2007/0094501 A1* | 4/2007 | Takamizawa | G06F 21/34 |
| | | | 713/170 |
| 2008/0147633 A1 | 6/2008 | Chandley | |
| 2013/0086110 A1 | 4/2013 | Kruger et al. | |
| 2015/0249540 A1* | 9/2015 | Khalil | H04L 63/18 |
| | | | 713/158 |
| 2016/0004394 A1 | 1/2016 | Macadaan et al. | |
| 2016/0344728 A1* | 11/2016 | Jeon | H04L 63/0838 |
| 2019/0020644 A1* | 1/2019 | Asai | H04W 12/068 |
| 2023/0056432 A1* | 2/2023 | Wu | H04W 12/069 |
| 2023/0086577 A1* | 3/2023 | Saravanan | H04L 69/22 |
| | | | 726/1 |

* cited by examiner

*Primary Examiner* — Techane Gergiso
(74) *Attorney, Agent, or Firm* — Greenberg Traurig, LLP

(57) ABSTRACT

In at least some embodiments, systems and methods of the present disclosure enable content selections for securing communications between agent devices and user devices. A request is received for a communication between an agent device and a user device. A user record associated with the user device is determined based on the characteristic. The security system may obtain content items for authenticating the agent device for the user device with the user record. A set of the plurality of content items are determined for display to the agent device. The set of the plurality of content items are transmitted to the user device associated with the user record. A content item identified by a content item selection is received. A match is determined between the selected content item and the set of content items. The communication is transmitted, responsive to the match, with a predetermined type data request for the user device to satisfy the authentication request.

20 Claims, 7 Drawing Sheets

SYSTEMS AND METHODS FOR CONTENT SELECTIONS FOR SECURING COMMUNICATIONS BETWEEN AGENT DEVICES AND USER DEVICES

FIELD OF TECHNOLOGY

The present disclosure generally relates to computer-based systems configured for content selections for securing communications between agent devices and user devices.

BACKGROUND OF TECHNOLOGY

Secure communications have become increasingly important for communication platforms. Secure communications prevent unauthorized access to data and allow users to trust the system.

Additionally, agent devices have finite storage and/or memory to store data. Authenticating user devices may be unreliable due to inconsistent network connections. Thus, maintaining secure connections for agent devices on their storage and/or memory while handling other tasks via a network connection may be unreliable.

SUMMARY OF DESCRIBED SUBJECT MATTER

In some aspects, the techniques described herein relate to a method including: receiving, by at least one processor, an authentication request between an agent device and a user device; wherein the authentication request includes at least one characteristic associated with the user device; determining, by the at least one processor, a user record associated with the user device based on the at least one characteristic; obtaining, by the at least one processor, a plurality of content items for authenticating the agent device for the user device with the user record; determining, by the at least one processor, a set of the plurality of content items based on the plurality of content items for display to the agent device for authenticating the agent device for the user device with the user record; transmitting, by the at least one processor, a subset of the set of the plurality of content items to the user device associated with the user record; receiving, by the at least one processor, from the agent device, at least one selected content item identified by at least one content item selection; determining, by the at least one processor, a match between the at least one selected content item and the subset of the set of the plurality of content items transmitted to the user device; and transmitting, by the at least one processor, responsive to the match, a communication with a predetermined type data request for the user device to satisfy the authentication request.

In some aspects, the techniques described herein relate to a method, further including: accessing, by the at least one processor, a datastore to obtain the plurality of content items that include images, text strings, graphical icons, or any combination thereof.

In some aspects, the techniques described herein relate to a method, further including: determining, by the at least one processor, based on the user record and an agent record of the agent device, the set of the plurality of content items for authenticating the agent device; and determining, by the at least one processor, based on the user record and the agent record of the agent device, the subset of the plurality of content items for transmitting to the user device.

In some aspects, the techniques described herein relate to a method, further including: generating, by the at least one processor, at least one of the set of the plurality of content items based on at least one of the plurality of content items, wherein the at least one of the set of the plurality of content items differs from the at least one of the plurality of content items.

In some aspects, the techniques described herein relate to a method, wherein receiving the at least one selected content item identified by the at least one content item selection further includes: causing, by the at least one processor, the set of the plurality of content items based on the plurality of content items to be displayed by the agent device in a user interface; and detecting, by the at least one processor, the at least one selected content item identified by the at least one content item selection from at least one interaction with the user interface displaying the set of the plurality of content items to the agent device.

In some aspects, the techniques described herein relate to a method, further including: determining, by the at least one processor, a mismatch between the at least one selected content item and the subset of the set of the plurality of content items transmitted to the user device; and transmitting, by the at least one processor, responsive to the mismatch, a notification to the user device.

In some aspects, the techniques described herein relate to a method, further including: receiving, by the at least one processor, a transmission from the user device, the transmission includes predetermined type data to satisfy the predetermined type data request.

In some aspects, the techniques described herein relate to a system including: a non-transient computer memory storing software instructions; and at least one processor configured to execute the software instructions that cause the at least one processor to: receive an authentication request between an agent device and a user device; wherein the authentication request includes at least one characteristic associated with the user device; determine a user record associated with the user device based on the at least one characteristic; determine a set of a plurality of content items based on the plurality of content items for display to the agent device for authenticating the agent device for the user device with the user record; transmit a subset of the set of the plurality of content items to the user device associated with the user record; receive, from the agent device, at least one selected content item identified by at least one content item selection; determine a match between the at least one selected content item received from the agent device and the subset of the set of the plurality of content items transmitted to the user device; and transmit responsive to the match, a communication with a predetermined type data request for the user device to satisfy the authentication request.

In some aspects, the techniques described herein relate to a system, wherein the at least one processor is further configured to execute the software instructions that cause the at least one processor to perform steps to: access a datastore to obtain the plurality of content items that include images, text strings, graphical icons, or any combination thereof.

In some aspects, the techniques described herein relate to a system, wherein the at least one processor is further configured to execute the software instructions that cause the at least one processor to perform steps to: determine, based on the user record and an agent record of the agent device, the set of the plurality of content items for authenticating the agent device; and determine, based on the user record and the agent record of the agent device, the subset of the plurality of content items for transmitting to the user device In some aspects, the techniques described herein relate to a system, wherein the at least one processor is further configured to execute the software instructions that cause the at least one processor to perform steps to: generate at least one of the set of the plurality of content items based on at least one of the plurality of content items, wherein the at least one of the set of the plurality of content items differs from the at least one of the plurality of content items.

In some aspects, the techniques described herein relate to a system, wherein to receive the at least one selected content item identified by the at least one content item selection, the at least one processor is further configured to execute the software instructions that cause the at least one processor to perform steps to: cause the set of the plurality of content items based on the plurality of content items to be displayed by the agent device in a user interface; and detect the at least one selected content item identified by the at least one content item selection from at least one interaction with the user interface displaying the set of the plurality of content items to the agent device.

In some aspects, the techniques described herein relate to a system, wherein the at least one processor is further configured to execute the software instructions that cause the at least one processor to perform steps to: determine a mismatch between the at least one selected content item and the subset of the set of the plurality of content items transmitted to the user device; and transmit, responsive to the mismatch, a notification to the user device.

In some aspects, the techniques described herein relate to a system, wherein the at least one processor is further configured to execute the software instructions that cause the at least one processor to perform steps to: receive a transmission from the user device, the transmission including predetermined type data to satisfy the predetermined type data request.

In some aspects, the techniques described herein relate to at least one computer-readable storage medium having encoded thereon software instructions that, when executed by at least one processor, cause the at least one processor to perform steps to: receive an authentication request between an agent device and a user device; wherein the authentication request includes at least one characteristic associated with the user device; determine a user record associated with the user device based on the at least one characteristic; determine a set of a plurality of content items based on the plurality of content items for display to the agent device for authenticating the agent device for the user device with the user record; transmit a subset of the set of the plurality of content items to the user device associated with the user record; receive, from the agent device, at least one selected content item identified by at least one content item selection; determine a match between the at least one selected content item received from the agent device and the subset of the set of the plurality of content items transmitted to the user device; and transmit, responsive to the match, a communication with a predetermined type data request for the user device to satisfy the authentication request.

In some aspects, the techniques described herein relate to an at least one computer-readable storage medium, wherein the software instructions are further configured to cause the at least one processor to perform steps to: access a datastore to obtain the plurality of content items that include images, text strings, graphical icons, or any combination thereof.

In some aspects, the techniques described herein relate to an at least one computer-readable storage medium, wherein the software instructions are further configured to cause the at least one processor to perform steps to: determine, based on the user record and an agent record of the agent device, the set of the plurality of content items for authenticating the agent device; and determine, based on the user record and the agent record of the agent device, the subset of the plurality of content items for transmitting to the user device.

In some aspects, the techniques described herein relate to an at least one computer-readable storage medium, wherein to receive the at least one selected content item identified by the at least one content item selection, the at least one processor is further configured to execute the software instructions that cause the at least one processor to perform steps to: cause the set of the plurality of content items based on the plurality of content items to be displayed by the agent device in a user interface; and detect the at least one selected content item identified by the at least one content item selection from at least one interaction with the user interface displaying the set of the plurality of content items to the agent device.

In some aspects, the techniques described herein relate to an at least one computer-readable storage medium, wherein the software instructions are further configured to cause the at least one processor to perform steps to: determine a mismatch between the at least one selected content item and the subset of the set of the plurality of content items transmitted to the user device; and transmit responsive to the mismatch, a notification to the user device.

In some aspects, the techniques described herein relate to an at least one computer-readable storage medium, wherein the software instructions are further configured to cause the at least one processor to perform steps to: generate at least one of the set of the plurality of content items based on at least one of the plurality of content items, wherein the at least one of the set of the plurality of content items differs from the at least one of the plurality of content items.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
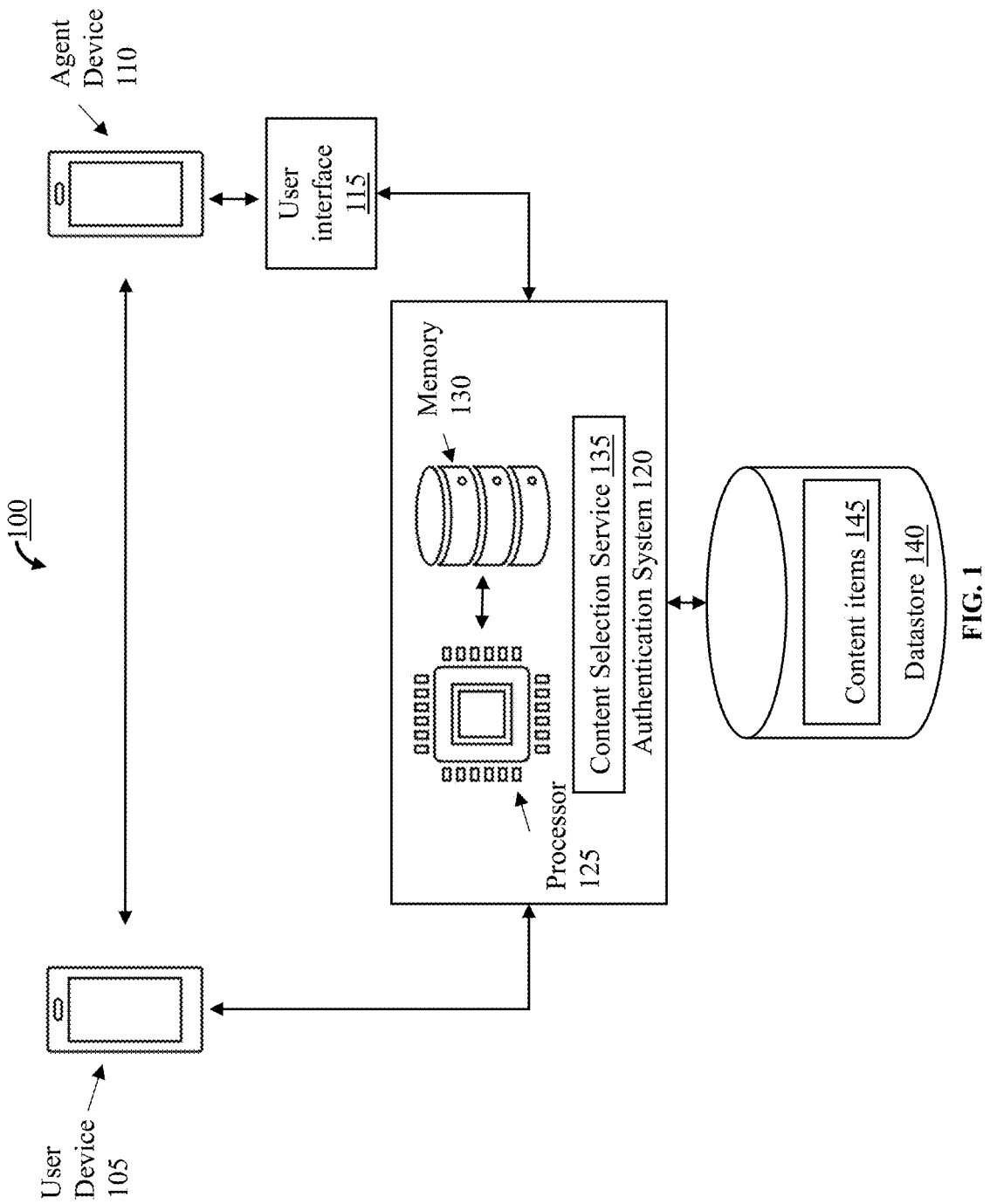
FIG. 1 is a block diagram of a system/platform for content selections for securing communications between agent devices and user devices in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of content selections for securing communications between agent devices and user devices. The following embodiments provide technical solutions and technical improvements that overcome technical problems, drawbacks and/or deficiencies in the technical fields involving computational resource inefficiencies for securing communications between agent devices and user devices, and slow and/or manual authentication and/or identification at the time of the communication as the typical solution to the inefficiencies of agent devices authenticating user devices.

Typically, authentication of a user device may involve an authentication server utilizing two-factor authentication by sending a text message (e.g., with a number) to a user device, and if the user device sends back the number in the text message, authenticate the user device relative to the authentication server. The authentication server may even utilize two-factor authentication to separately authenticate the agent device. However, this approach would not be able to verify both the user device and the agent device relative to each other to facilitate secure communications between them. For example, the user device may be unable to determine that it is communicating with an agent device that is authenticated, which may be problematic because even an agent device that is authenticated relative to the authentication server may still be used maliciously against the user device (e.g., insider attack or spoofing). Moreover, using numbers in text messages to authenticate devices may be problematic because numbers may be guessed and/or predicted, whereas complicated numbers and/or codes may be a computational burden to the device and authentication server.

As explained in more detail below, technical solutions and technical improvements herein include aspects of improved security of communications between user devices and agent devices by involving a security system to use machine learning (ML) techniques to predict content tailored and customized for the user device and the agent device to authenticate each other for more efficient and secure communications between the user devices and the agent devices. Based on such technical features, further technical benefits may become available to users and operators of these systems and methods. Moreover, various practical applications of the disclosed technology are also described, which provide further practical benefits to users and operators that are also new and useful improvements in the art.

FIG. 1 is a block diagram of a system/platform 100 for content selections for securing communications between agent devices and user devices in accordance with one or more embodiments of the present disclosure. The system 100 may include a user device 105 of a user, an agent device 110 of an agent that may interact with a user interface 115 of the agent device 110. For example, the agent device 110 may be a service provider, order management system, or a point-of-sale (POS) system. The system 100 may include an authentication system 120 for content selections for securing communications between the user device 105 and the agent device 110. The authentication system 120 may include a processor 125 coupled to a memory 130, and a content selection service 135. The user device 105, agent device 110, and the authentication system 120 may all communicate with each other. The authentication system 120 may communicate with a datastore 140 that includes content items 145.

In some embodiments, the plurality of content items 145 comprises images, text strings, graphical icons, or any combination thereof. In some embodiments, the plurality of content items 145 may include images that are unique and discernable for display on the user device 105 and/or the agent device 110. For example, the plurality of content items 145 may include images of landmarks. In another example, the plurality of content items 145 may include images of animals. In another example, the plurality of content items 145 may include images of food. In some embodiments, the plurality of content items 145 may include text strings that include natural language for display on the user device 105 and/or the agent device 110. For example, the plurality of content items 145 may include phrases. In another example, the plurality of content items 145 may include a sequence of numbers. In another example, the plurality of content items 145 may include a symbol. In some embodiments, the plurality of content items 145 may include text strings that include natural language for display on the user device 105 and/or the agent device 110. For example, the plurality of content items 145 may include phrases. In another example, the plurality of content items 145 may include a sequence of numbers. In some embodiments, the plurality of content items 145 may include graphical icons that are unique and discernable for display on the user device 105 and/or the agent device 110. For example, the plurality of content items 145 may include one or more symbols and/or shapes. In another example, the plurality of content items 145 may include a QR code. In another example, the plurality of content items 145 may include graphical icons that are animated.

In some embodiments, the user device 105 may include any computing device from electronic activities are performed or executed, such as, e.g., a terminal, personal computer, or mobile computing device for performing Internet-based and application-based activities (e.g., account logins, account information changes, online purchases, instant message communications, social media posts, among others and combinations thereof). As a result of the user executing electronic activities via the user device 105, data entries may be produced for entry into the user's account. For example, the user device 105 may produce user records 215 (described below).

In some embodiments, the agent device 110 may include a physical terminal for performing electronic communications, such as, e.g., a point-of-sale device, automated teller machine (ATM), a customer service computer for troubleshooting a social media account, device for vehicle administration, any device not within the control of the user device but with the ability to communicate with the user device (e.g., to administer a user account or service), or other device. As a result of an agent executing electronic activities via the agent device 110, data entries may be produced for entry into the user's account. For example, the agent device 110 may produce agent records 220 (described below).

In some embodiments, the user device 105, agent device 110, and/or the authentication system 120 may include a communication application for sending and/or receiving communications over a communications network with other entities. In some embodiments, a user of the user device 105 may interact with a communication interface to send and/or receive the communications with another device of another entity over a communication network. In some embodiments, the entity may include, e.g., another user, organization, company, service, etc. In some embodiments, the communication interface may include a graphical user interface (GUI), including, e.g., view data associated with an entity of the other device 105 such as identifying information including, e.g., a device identifier, an entity identifier, a name, a network address (e.g., IP address, telephone number, email address, social media handle, etc.) among other data or any combination thereof.

In some embodiments, the communication network may include a suitable network for sending and/or receiving digital and/or analog information. For example, the communication network may include, e.g., a public switched telephone network (PSTN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the user device 105, agent device 110, and/or the authentication system 120 may communicate via a content item application programming interface or other suitable interface technology. In some embodiments, the term "application programming interface" or "API" refers to a computing interface that defines interactions between multiple software intermediaries. An "application programming interface" or "API" defines the kinds of calls or requests that may be made, how to make the calls, the data formats that should be used, the conventions to follow, among other requirements and constraints. An "application programming interface" or "API" may be entirely custom, specific to a component, or designed based on an industry-standard to ensure interoperability to enable modular programming through information hiding, allowing users to use the interface independently of the implementation.

In some embodiments, the authentication system 120 may be a part of any suitable computing device and/or system. For example, the authentication system 120 may include hardware and software components including physical computing hardware (e.g., one or more laptop computers, desktop computers, mobile computing devices, servers, etc.), virtual computing resources (e.g., one or more virtual machines and/or operating system containers), or any suitable combination thereof. For example, the authentication system 120 may be implemented as a service on a cloud platform.

In some embodiments, the authentication system 120 may include hardware components such as a processor 125, which may include local or remote processing components. In some embodiments, the processor 125 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 125 may include data-processing capacity provided by the microprocessor. In some embodiments, the microprocessor may include memory, processing, interface resources, controllers, and counters. In some embodiments, the microprocessor may also include one or more programs stored in memory.

Similarly, the authentication system 120 may include memory 130, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the memory 130 may include, e.g., a suitable non-transient computer readable medium such as, e.g., non-transient computer memory, random access memory (RAM), read only memory (ROM), one or more buffers and/or caches, among other memory devices or any combination thereof.

In some embodiments, the authentication system 120 may implement computer engines for inferring relevant content items, e.g., based on authentication activities performed between the user device 105 and the agent device 110. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the datastore 140 may include any suitable data storage solution including, e.g., a suitable memory or storage solutions for maintaining content items 145. For example, the data storage solution may include database technology such as, e.g., a centralized or distributed database, cloud storage platform, decentralized system, server, or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, a "database" may refer to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, a content-relationship database, an enhanced content-relationship database, a document database, a content-attribute-value database, a star schema database, or any other suitable database model and combinations thereof. For example, the database may include database technology such as, e.g., a centralized or distributed database, cloud storage platform, decentralized system, server, or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model of the datastore 140, one or more database query languages may be employed to retrieve data from the datastore 140. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

Figure 2:
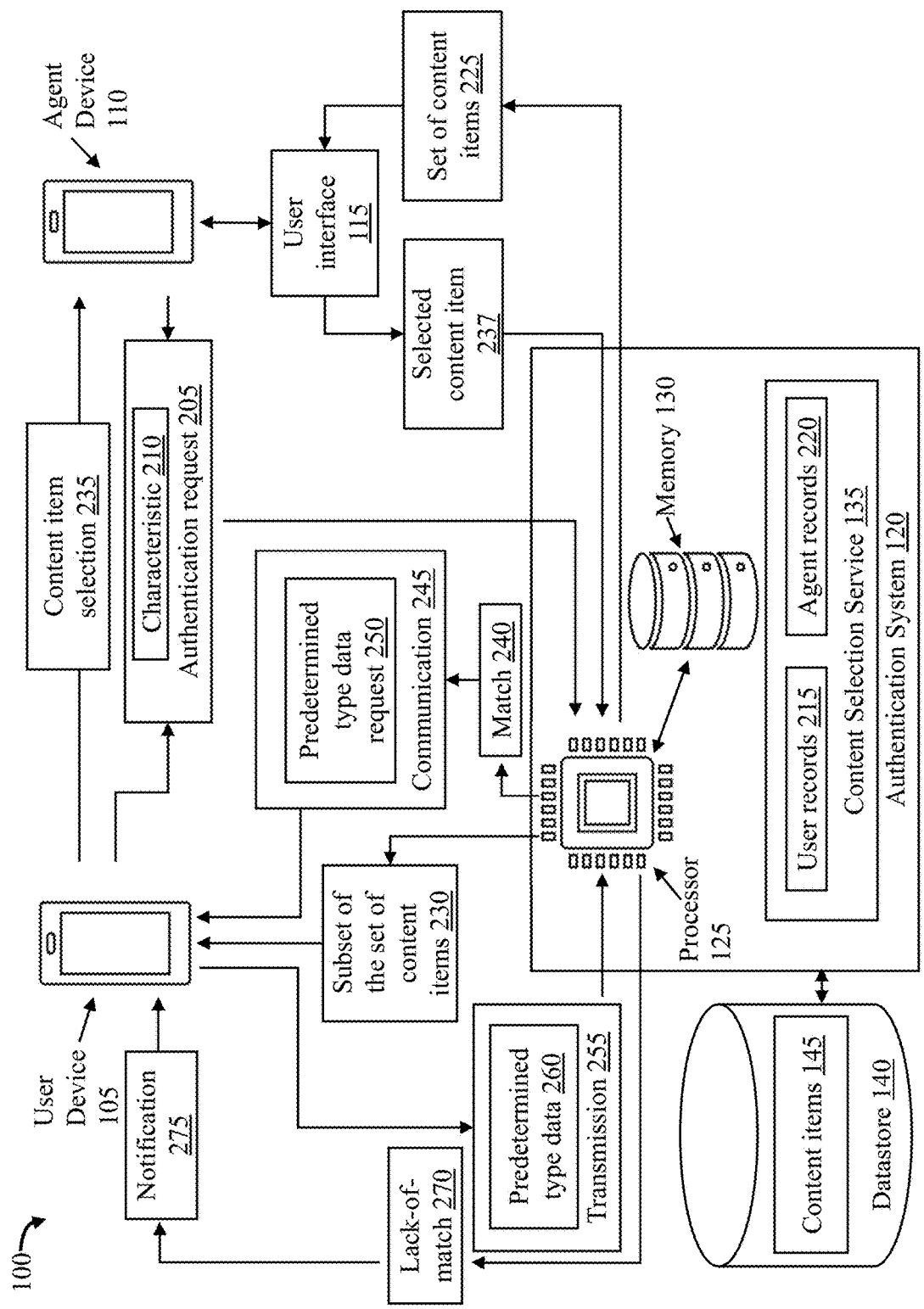
FIG. 2 is a flow diagram of a system/platform for content selections for securing communications between agent devices and user devices in accordance with one or more embodiments of the present disclosure.

FIG. 2 is a block diagram of a system/platform 100 for content selections for securing communications between agent devices and user devices in accordance with one or more embodiments of the present disclosure. In some embodiments, the authentication system 120 may receive an authentication request 205 between an agent device 110 and a user device 105. In some embodiments, the authentication request 205 may be a request to verify the user device 105 and the agent device 110 relative to each other. For example, the authentication request 205 may be a request to identify whether the user device 105 is communicating with the agent device 110 instead of a spoofed agent device 110. In another example, the authentication request 205 may be a request to identify whether the agent device 110 is communicating with the user device 105 instead of a spoofed user device 105. For example, as further described below, the authentication system 120 may determine that the user device 105 and the agent device 110 are authentically communicating if the at least one selected content item 237 matches the subset of the set of content items 230. In some embodiments, as further described below, the authentication system 120 may transmit the communication 245 responsive to identifying the match. The authentication system 120 may transmit the communication 245 to satisfy the authentication request 205. The authentication system 120 may satisfy the authentication request 205 to enable secure communications between the user device 105 and the agent device 110.

In some embodiments, the authentication request 205 may be received by the authentication system 120 subsequent to the user device 105 attempting to communicate with the agent device 110. In some embodiments, the authentication request 205 may be responsive to the agent device 110 requesting secure information from the user device 105. For example, the agent device 110 associated with a pizza shop may receive a request from the user device 105 to place an order for pizza, and the agent device 110 may request payment information from the user device 105. The customer may not want to read their credit card out loud to the agent around a bunch of people, so the user device 105 receives a selection from the customer to initiate the authentication request 205 to authenticate the agent device 110. The selection may be an audio input, a text input, or selections in a user interface displayed by the user device 105. For example, the user device 105 may receive an audio description from a user (e.g., "initiate authentication of agent"), an input (e.g., key press of a number), or selections in an interface on the user device (e.g., selection of an authentication button displayed in the user interface).

In some embodiments, the authentication system 120 may receive the authentication request 205 from the user device 105. In some embodiments, the authentication system 120 may receive the authentication request 205 from the agent device 110. In some embodiments, the user device 105 may transmit the authentication request 205 to the agent device 110, which may forward the authentication request 205 to the authentication system 120.

In some embodiments, the authentication system 120 may identify or detect a characteristic 210 from the authentication request 205. In some embodiments, the authentication request 205 includes at least one characteristic 210 associated with the user device 105. In some embodiments, the authentication system 120 may analyze the authentication request 205 to identify or detect the characteristic 210. The characteristic 210 may be any data structure that identifies the user device 105 or its user. In some embodiments, the characteristic 210 may include metadata having an endpoint identifier that identifies an endpoint (e.g., the source and/or recipient) of communications, such as, e.g., the device identifier and/or the network address associated with the user device 105. The characteristic 210 may identify the user device 105 for the purposes of electronic communication.

Examples of the characteristic 210 include a phone number associated with the user device 105, an account identifier associated with the user device 105, a device identifier associated with the user device 105, and/or an IP address associated with the user device 105. In another example, the characteristic 210 may include metadata that identifies the phone number, account identifier, or device identifier associated with the user device 105. In another example, the characteristic 210 may include a token that identifies the phone number, account identifier, or device identifier associated with the user device 105. In another example, the characteristic 210 may include a serial number that identifies the phone number, account identifier, or device identifier associated with the user device 105. In some embodiments, the authentication system 120 may analyze the meta data, token, and/or serial number to identify or detect the characteristic 210.

In some embodiments, the authentication system 120 may parse the audio signal to identify the authentication request 205 and the characteristic 210. For example, after the agent device 110 associated with the pizza shop receives a request (e.g., spoken request) from the user device 105 to place an order for pizza, the agent device 110 may identify and/or detect the phone number associated with the user device 105. In another example, an agent of the agent device 110 may input a phone number associated with the user device 105 into the agent device 110. The agent device 110 may provide the phone number to the authentication system 120.

In some embodiments, the authentication system 120 may monitor the agent device 110 and the user device 105 to identify that the agent device 110 and the user device 105 are attempting to communicate. Subsequent to the identification, the authentication system 120 may identify the at least one characteristic 210 associated with the user device 105. In some embodiments, the authentication system 120 may determine one or more user records 215 associated with the user device 105 based on the at least one characteristic 210. In some embodiments, the authentication system 120 may determine one or more agent records 220 associated with the agent device 110. For example, subsequent to identifying that the agent device 110 and the user device 105 are attempting to communicate, the authentication system 120 may identify the one or more agent records 220 associated with the agent device 110.

In some embodiments, the authentication system 120 may utilize the content selection service 135 to select the plurality of content items 145 for securing communications between the user device 105 and the agent device 110. For example, the authentication system 120 may use the plurality of content items 145 to authenticate an identity of the agent device 110 for the user device 105 in response to the authentication request 205 from the user device 105. In some embodiments, the authentication system 120 may utilize the content selection service 135 to access a datastore 140 to retrieve the plurality of content items 145. The content selection service 135 may use the plurality of content items 145 for authenticating the agent device 110 for the user device 105 with the one or more user records 215.

In some embodiments, the authentication system 120 may determine and/or select a set of the plurality of content items 225 based on the plurality of content items 145 for display to the agent device 110. For example, the authentication system 120 may determine and/or select the set of the plurality of content items 225 may be chosen from thousands of pictures. In another example, the authentication system 120 may determine and/or select the set of the plurality of content items 225 randomly. In some embodiments, the authentication system 120 may determine and/or select the set of the plurality of content items 225 based on the plurality of content items 145 for display to the agent device 110. In some embodiments, the authentication system 120 may select, based on the one or more user records 215 and the one or more agent records 220 of the agent device 110, the set of the plurality of content items 225 for authenticating the agent device 110 with the user device 105. For example, the authentication system 120 may determine and/or select the set of the plurality of content items 225 that are predefined for the user device 105 and/or the agent device 110. In another example, the authentication system 120 may determine and/or select the plurality of content items 225 that are an arrangement of pictures in a specific configuration and/or with particular colors. In some embodiments, the authentication system 120 may determine and/or select the set of the plurality of content items 225 using machine learning techniques as described in FIG. 3. In some embodiments, the authentication system 120 may transmit the set of the set of the plurality of content items 225 to the agent device 110.

In some embodiments, the authentication system 120 may generate at least one of the set of the plurality of content items 225 based on at least one of the plurality of content items 145. For example, the authentication system 120 may generate the plurality of content items 225 for display on the user device 105 and/or the agent device 110. In some embodiments, the at least one of the set of the plurality of content items 225 may differ from the at least one of the plurality of content items 145. For example, the content item 145 may be a picture of a store front, but the generated content item 225 may be name of the store that is extracted from the picture.

In some embodiments, the authentication system 120 may determine and/or select a subset of the plurality of content items 230 of the set of the plurality of content items 225 for display to the user device 105. For example, the authentication system 120 may transmit the plurality of content items 230 to the user device 105 for display to the user. In some embodiments, the authentication system 120 may transmit, based on the identifier defined by the characteristic 210, a link to view the plurality of content items 230. For example, the user device 105 may receive a selection by the user (e.g., via a user interface on the user device 105) of the link and display (e.g., via the user interface) a series of pictures to the user. In some embodiments, the authentication system 120 may determine and/or select, based on the one or more user records 215 and the one or more agent records 220 of the agent device 110, the subset of the plurality of content items 230 for transmitting to the user device 105. In some embodiments, the authentication system 120 may transmit the subset of the plurality of content items 230 to the user device 105 associated with the one or more user records 215. For example, the authentication system 120 may transmit (i) a set of the plurality of content items 225 (e.g., 5 animal pictures) to the agent device 110 and (ii) a subset of the plurality of content items 230 (e.g., 3 of the 5 animal pictures) to the user device 105.

In some embodiments, the content selection 235 is received by the agent device 110 from the user device 105. In some embodiments, the at least one content item selection 235 may be selections of the subset of the plurality of content items 230 transmitted and/or displayed by the user device 105. In some embodiments, the authentication system 120 may receive the content item selection 235 forwarded by the agent device 110 may from the user device 105. The at least one content item selection 235 may be an audio input, a text input, or selections in a user interface displayed by the user device 105. For example, the user device 105 may receive an audio description from a user (e.g., "I see a cow, cat, and dog") corresponding to the content item selection 235, a text input (e.g., cow, cat, and dog) corresponding to the content item selection 235, or selections of the plurality of content items displayed in an interface on the user device 105.

In some embodiments, the content item selection 235 is received by the agent device 110 as an audio signal. In some embodiments, the audio signal is from the user device 105. For example, a user may speak into the user device 105 to describe the content item selections 235 (e.g., the 3 animal pictures). The agent device 110 may parse the audio signal to identify and determine and/or select the at least one selected content item 237 among the set of the plurality of content items 225 (e.g., the 3 animal pictures of the 5 animal pictures). In some embodiments, the audio signal is from the agent device 110. For example, the user device 105 may transmit the content item selections 235 to the agent device 110, which may then receive the audio signals (e.g., from the agent using the agent device 110) describing the at least one selected content item 237.

In some embodiments, the authentication system 120 may receive from the agent device 110, at least one selected content item 237 identified by the at least one content item selection 235. In some embodiments, the authentication system 120 may cause the set of the plurality of content items 225 based on the plurality of content items 145 to be displayed by the agent device 110 in a user interface 115. In some embodiments, the authentication system 120 may detect the at least one selected content item 237 from at least one interaction with the user interface 115 displaying the set of the plurality of content items 225 to the agent device 110. For example, the user device 105 may transmit the at least one content item selection 235 to the agent device 110 (e.g., 3 animal pictures as audio, text, or selections), and the agent device 110 may select at least one selected content item 237 among the set of the plurality of content items 225 (e.g., selects the 3 animal pictures of the 5 animal pictures).

The authentication system 120 may verify that the at least one selected content item 237 matches the subset of the set of content items 230 sent to the user device 105 to authenticate the identity of the agent device 110 for the user device 105. In some embodiments, the authentication system 120 may compare the at least one selected content item 237 to the subset of the set of content items 230. For example, the authentication system 120 may compare the animal pictures received from the agent device 110 to the animal pictures sent to the user device 105. For example, the authentication system 120 may identify that the animal pictures received from the agent device 110 are the same animal pictures that were sent to the user device 105. Conversely, the authentication system 120 may identify that the animal pictures received from the agent device 110 are different from the animal pictures that were sent to the user device 105, which may imply that the user device 105 and the agent device 110 were not communicating with each other. In another example, the authentication system 120 may identify that the phrases and/or alphanumeric entries received from the agent device 110 are the same phrases and/or alphanumeric entries that were sent to the user device 105. Conversely, the authentication system 120 may identify that the phrases and/or alphanumeric entries received from the agent device 110 are different from the phrases and/or alphanumeric entries that were sent to the user device 105, which may imply that the user device 105 and the agent device 110 were not communicating with each other. In another example, the authentication system 120 may identify that the graphical icons received from the agent device 110 are the same graphical icons that were sent to the user device 105. Conversely, the authentication system 120 may identify that the graphical icons received from the agent device 110 are different from the graphical icons that were sent to the user device 105, which may imply that the user device 105 and the agent device 110 were not communicating with each other.

By comparing the transmitted subset of the plurality of content items 230 (e.g., the 3 animal pictures) to the received at least one selected content item 237 (e.g., the 3 animal pictures of the 5 animal pictures), the authentication system 120 may verify that the agent device 110 received the subset of the plurality of content items 230 from the user device 105. For example, the authentication system 120 may make the verification because the user device 105 provides the at least one content item selection 235 to the agent device 110, so the comparison between what was sent to the user device 105 and received from the agent device 110 may imply whether the user device 105 and the agent device 110 are actually communicating with each other. In some embodiments, the authentication system 120 may identify whether there is a match between the at least one selected content item 237 received from the agent device and the subset of the plurality of content items 230 transmitted to the user device 105.

By identifying whether there is a match, the authentication system 120 may enable secure communications between the user device 105 and the agent device 110 by determining whether the user device 105 is communicating with the agent device 110 that is authentic. For example, since the security system 120 may only transmit the set of the plurality of content items 225 to the agent device 110 that is known to be authentic, then only the agent device 110 that is authentic may transmit the at least one selected content item 237 that matches at least one of the set of the plurality of content items 225. Conversely, for example, if the user device 105 is communicating with a malicious device that may be spoofing or impersonating the agent device 110 to request information from the user device 105, then the malicious device may not be able to have the plurality of content items 225 from the authentication system 120 and thus the malicious device may not transmit the at least one selected content item 237 that could be matched to the plurality of content items 230 transmitted to the user device 105.

The authentication system 120 may be triggered to transmit a communication 245 to the user device 105 if the content selections match. In some embodiments, the authentication system 120 may transmit the communication 245 responsive to identifying the match between the at least one selected content item 237 and the subset of the set of content items 230. For example, responsive to determining the match, the authentication system 120 may use the communication 245 to enable the agent device 110 and the user device 105 to establish secure communications.

In some embodiments, the authentication system 120 may transmit the communication 245 to the user device 105 to satisfy the authentication request 205. In some embodiments, by transmitting the communication 245 to satisfy the authentication request 205, the authentication system 120 may enable the user device 105 and the agent device 110 to establish the secure communications between themselves. For example, satisfying the authentication request 205 may indicate to the user device 105 that the user device 105 is communicating with the agent device 110 that is authentic and not spoofing. By utilizing the authentication system 120 to satisfy the authentication request 205 to establish secure communications between the agent device 110 and the user device 105, there may be a more efficient use of device memory and networking bandwidth for the user device 105, the agent device 110, and the authentication system 120 when compared to alternative approaches, such as having the user device 105 and the agent device 110 engage in bilateral but computationally intensive encryption techniques.

After determining to transmit the communication 245, the authentication system 120 may query and/or transmit to the user device 105 the communication 245 that includes a predetermined type data request 250. For example, the communication 245 may be transmitted as a text message or a push notification to the user device 105. In some embodiments, the authentication system 120 may transmit, responsive to the match (e.g., between the at least one selected content item 237 and the subset of the set of content items 230), a communication 245 with a predetermined type data request 250. For example, the predetermined type data request 250 may request for payment information from the user device 105 and indicate a payment amount to pay for products (e.g., pizza) offered by the agent device 110. The authentication system 120 may enable more secure communications between the user device 105 and the agent device 110 by identifying the match between the at least one selected content item 237 and the subset of the set of content items 230 to provide the communication 245 to satisfy the authentication request 205, and then requesting the user device 105 to provide sensitive information (e.g., payment information) to the agent device 110 and/or authentication system 120.

The user device 105 may respond to the communication 245 from the authentication system 120 with a transmission 255 that includes the predetermined type data 260. In some embodiments, the authentication system 120 may receive a transmission 255 from the user device 105. The authentication system 120 may receive the transmission 255 responsive to transmitting the predetermined type data request 250. For example, the predetermined type data request 250 may be a request for payment, and the transmission 255 may include the payment information to pay for products (e.g., via a payment portal or payment application) offered by the agent device 110. The transmission 255 may include predetermined type data 260 to satisfy the predetermined type data request 250. For example, the predetermined type data 260 may include the payment amount to pay for the products (e.g., pizza), which may satisfy the payment request included in the predetermined type data request 250. By having the communication 245 and the transmission 255 between the user device 105 and the authentication system 120, the user device 105 may authenticate the identity of the agent device 110 but still bypass the agent device 110 when sharing secure information (e.g., to make the payment). Subsequent to receiving the transmission 255, the authentication system 120 may notify the agent device 110 that the transmission 255 was received from the user device 105. For example, the authentication system 120 may notify the agent device 110 associated with the pizza shop that the user device associated with the customer paid for the pizza.

In some embodiments, the authentication system 120 may determine a mismatch 270 between the at least one selected content item 237 and the subset of the plurality of content items 230 transmitted to the user device 105. For example, the authentication system 120 may identify that the pictures provided to the user device 105 did not match the pictures received by the agent device 110. In some embodiments, the authentication system 120 may transmit, responsive to the mismatch 270, a notification 275 to the user device 105. For example, the authentication system 120 may use the notification 275 to notify the user device 105 of communications with an agent device 110 that is not authenticated. The notification 275 may indicate that the agent device 110 might be hacked and sending fake communications.

In some embodiments, the authentication system 120 may use the notification 275 to indicate that the user device 105 may resubmit the content item selections 235. For example, the user device 105 may have received an incorrect selection, so the user device 105 may resubmit. In some embodiments, the authentication system 120 may transmit, responsive to the mismatch 270, a request to the agent device 110 to resubmit the at least one selected content item 237. For example, the agent device 110 may have received an incorrect selection, so the user device 105 may resubmit.

In some embodiments, the authentication system 120 may cause, responsive to the mismatch 270, the content selection service 135 to determine and/or select a new set of the plurality of content items for transmission to the agent device 110 and a subset of the new set of the plurality of content items for transmission to the user device 105. In some embodiments, the content selection service 135 may determine and/or select the new set of the plurality of content items based on the mismatch 270. For example, some content items 145 may be error prone or confusing, so the content selection service 135 may avoid selecting such content or similar content.

Figure 3:
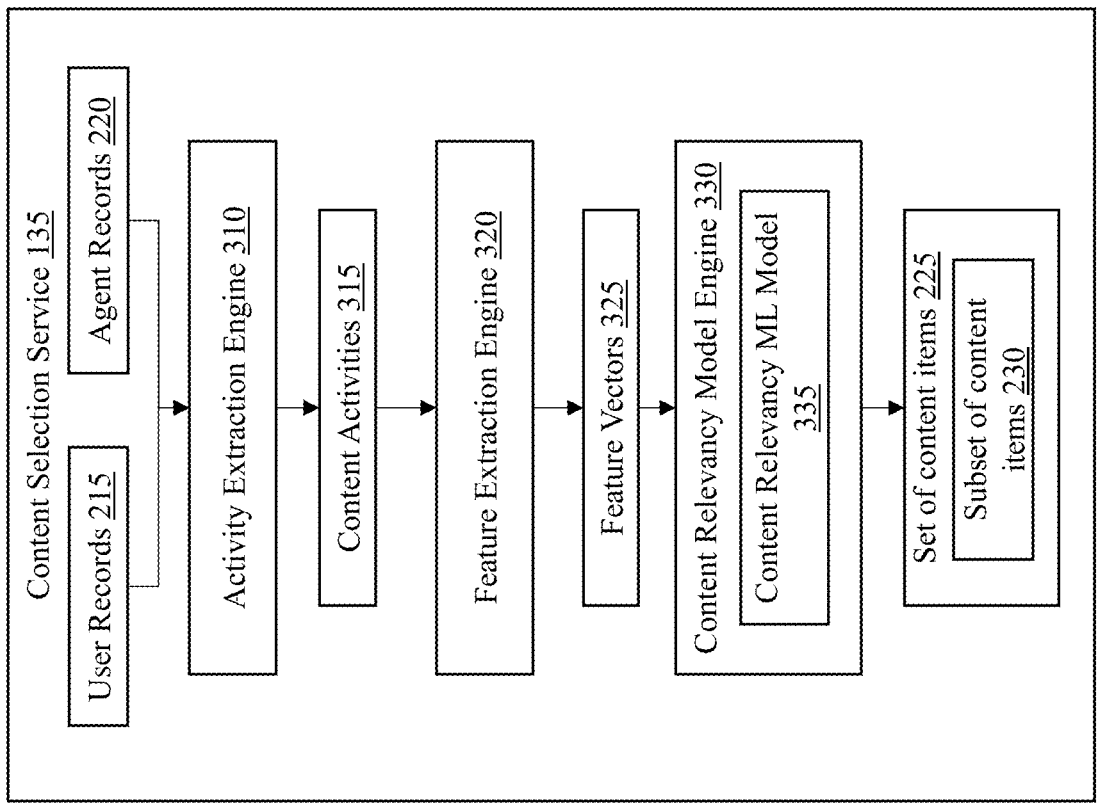
FIG. 3 is a flow diagram of a content selection service for content selections for securing communications between agent devices and user devices in accordance with one or more embodiments of the present disclosure.

Now referring to FIG. 3, in some embodiments, to intelligently determine and/or select the set of the plurality of content items 225 and the subset of the plurality of content items 230 for the agent device 110 and the user device 105, respectively, the authentication system 120 may utilize the content selection service 135 to select determine and/or the plurality of content items 225 that are relevant to the user device 105 for authenticating the agent device 110. To do so, the content selection service 135 may leverage user records 215 and agent records 220 that may identify previously selected content items 225 and content items 230, the content item selections 235, and/or at least one selected content item 237 generated responsive to the plurality of content items 225 and content items 230.

The authentication system 120 may utilize the content selection service 135 for selecting content items 145 based on the user records 215 and the agent records 220 to customize the selections of content items based on the agent device 110 and the user device 105. In some embodiments, the content selection service 135 may receive user records 215 and agent records 220. The datastore 140 may aggregate the user records 215 and agent records 220 from one or more sources. In some embodiments, the content selection service 135 may scrape data from websites to acquire the user records 215 and the agent records 220 from the internet, may request the user records 215 and the agent records 220 from one or more API's or data source API's (e.g., a search engine, social media, delivery service, ratings, and reviews service, contact or telephone number lists, address list, etc.), among other sources or any combination thereof. In some embodiments, the user records 215 and the agent records 220 may be extracted from or otherwise augmented from the plurality of content items, such as, e.g., content name and/or identifier, among other data or any combination thereof.

The user records 215 may include attributes associated with the user device 105. These attributes can assist the content selection service 135 to select which of the plurality of content items 145 to provide to the user device 105 and the agent device 110. For example, the content selection service 135 can use user records 215 identifying a screen size of the user device 105 to identify which of the plurality of content items 145 can be clearly displayed on the user device 105. In another example, the content selection service 135 can use the agent records 220 identifying whether the agent device 110 includes a keyboard or a touchscreen to identify which of the plurality of content items 145 can be selected on the agent device 110.

In some embodiments, the one or more user records 215 and the agent records 220 representing the activity histories for each user device 105 and agent device 110, respectively, may be cataloged in the datastore 140. In some embodiments, the user records 215 and the one or more agent records 220 may include, e.g., an identifier, a telephone number, a callback number (e.g., different from a telephone number listed for the user device 105 and/or agent device 110), an address or other user device 105 and/or agent device 110 location (e.g., latitude-longitude, landmark, etc.), a website, an email address, an user device 105 and/or agent device 110 social media account, among other data or any combination thereof.

In some embodiments, the user records 215 and the agent records 220 may include a user identifier associated with each data entry, an agent identifier associated with each data entry, an activity type identifier, an activity value or activity quantity, a time data item, a location data item, a date data item, a device type or device identifier associated with the user device 105, an activity description, or other attributes of each data entry. For example, the user records 215 can include attributes that describe a user associated with the user device 105, a device type or model associated with the user device 105, and/or how the user device 105 has been used to communicate with the agent device 110 and/or the authentication system 120. The agent records 220 may include attributes associated with the agent device 110. In another example, the agent records 215 can include attributes that describe an agent associated with the agent device 110, a device type or model associated with the agent device 110, and/or how the agent device 110 has been used to communicate with the user device 105 and/or the authentication system 120. In another example, the user records 215 and agent records 220 may correspond to users with user profiles and agent profiles, respectively, in the datastore 140, for example the user profiles may be for customers of a bank, including merchants, vendors, venues, individuals, services, etc.

For example, the datastore 140 may store a transaction-related activity, such as a transaction record (e.g., transaction authorization request, posted transaction, etc.). In such an example, the data items may include, e.g., a transaction value, a transaction type, an account identifier, or a user identifier or both, a merchant identifier, a transaction authorization date, a transaction postdate, a transaction location, an execution device (e.g., point-of-sale device, Internet payment, etc.) among other transaction data and combinations thereof.

In another example, the user records 215 and the agent records 220 may identify a history of one or more authentication requests 205, content item selections 235, communications 245, and transmission 255. In such an example, the user records 215 and the agent records 220 may include communication data size, communication duration, communication time, communication date, among other communication data items or any combination thereof.

In some embodiments, the content selection service 135 may identify the user records 215 and the agent records 220. In some embodiments, the content selection service 135 may identify the user records 215 associated with the characteristic 210. In some embodiments, the content selection service 135 may access the datastore 140 and identify the user records 215 associated with the characteristic 210. In some embodiments, the content selection service 135 may identify the agent records 220 associated with the agent device 110. In some embodiments, the content selection service 135 may access the datastore 140 and identify the agent records 220 associated with the agent device 110. The content selection service 135 may use the characteristic 210 to query the datastore 140. The characteristic 210 may be an account and/or profile identifier or may be any other suitable user identifier that is associated with the user records 215 of the user device 105. Thus, the datastore 140 may return the user records 215 associated with the user device 105 and the agent records 220 associated with the agent device 110. Accordingly, the content selection service 135 may analyze the user records 215 associated with the user device 105 and the agent records 220 associated with the agent device 110. In some embodiments, the content selection service 135 may access the datastore 140 that stores the user records 215 associated with the user device 105 and the agent records 220 associated with the agent device 110.

In some embodiments, upon receiving the authentication request 205, the authentication API may route the query to the content selection service 135. In some embodiments, the authentication request 205 may include user attributes, such as, e.g., a user profile identifier, a user identifier, a device identifier, etc., a user location, a data, a time, among other attributes or any combination thereof.

In some embodiments, to determine the plurality of content items 145 with which the user has interacted, the content selection service 135 may include computer engines including, e.g., an activity extraction engine 310, to identify (e.g., in the datastore 140) the user records 215 of the user and extract the content activities 315 associated with the user records 215. In some embodiments, in order to implement the activity extraction engine 310, the activity extraction engine 310 may include dedicated and/or shared software components, hardware components, or a combination thereof. For example, the activity extraction engine 310 may include a dedicated processor and storage. However, in some embodiments, the activity extraction engine 310 may share hardware resources, including the processor 125 and memory 130 of the authentication system 120 via, e.g., a bus.

In some embodiments, the activity extraction engine 310 may identify the user records 215 and the agent records 220 associated with the authentication request 205, e.g., based on the user profile identifier, the user identifier, the device identifier, etc. The activity extraction engine 310 may then identify (e.g., query the datastore 140) the user records 215 and the agent records 220 associated with the user device 105 and the agent device 110, respectively. The activity extraction engine 310 may receive (e.g., from the datastore 140), in response to the query, the user records 215 and the agent records 220 such that the activity extraction engine 310 may identify the content activities 315 associated with the user records 215 and the agent records 220. In some embodiments, the content activities 315 may be used to identify content items 145 with which the user has engaged with. Thus, relevance of content items may be inferred from the content activities 315 according to, e.g., frequency, recency and/or quantity of each content item in the library of content items.

In some embodiments, to infer the relevancy of content items, the activity extraction engine 310 may extract the content activities 315 from the user records 215 and the agent records 220. In some embodiments, the activity extraction engine 310 may extract all of the content activities 315. Alternatively, the activity extraction engine 310 may extract a subset of the content activities 315 such as the content activities 315 from a particular period of time, having particular attributes or parameters, from a particular location, or any suitable combination thereof. For example, the activity extraction engine 310 may identify (e.g., query the datastore 140) content activities 315 within a predetermined amount of time from a current time, within a predetermined distance from the location of the user device 105 and/or the agent device 110 (e.g., based on the location data of the authentication request 205, among other parameters for a query or any combination thereof.

For example, the predetermined amount of time may be, e.g., within 1 day, 1 week, 1 month, 3 months, 4 months, 6 months, 1 year, or longer or any other suitable amount of time in the range of, e.g., 1 day to 2 years.

In another example, the predetermined distance may be, e.g., within 1 mile, 2 miles, 3 miles, 4 miles, 5 miles, 6 miles, 7 miles, 8 miles, 9 miles, 10 miles, 15 miles, 20 miles, 25 miles, 30 miles, 35 miles, 45 miles, 50 miles, 55 miles, 60 miles, 70 miles, 80 miles, 85 miles, 90 miles, 95 miles, 100 miles, 150 miles, 200 miles, 250 miles, 500 miles, or any other suitable distance in a range of, e.g., 1 to 1000 miles. Alternatively, or additionally, the predetermined distance may be, e.g., in a same neighborhood, town, city, county, zip code, state, territory, province, region, country, continent or other suitable geographic region or any combination thereof.

In some embodiments, the activity extraction engine 310 may provide the content activities 315 to a computer engine including, e.g., a feature extraction engine 320. The content selection service 135 may use the feature extraction engine 320 to formulate feature vectors 325 for each content item with which the user device 105 and/or the agent device 110 has interacted. In some embodiments, in order to implement the feature extraction engine 320, the feature extraction engine 320 may include dedicated and/or shared software components, hardware components, or a combination thereof. For example, the feature extraction engine 320 may include a dedicated processor and storage. However, in some embodiments, the feature extraction engine 320 may share hardware resources, including the processor 125 and memory 130 of the authentication system 120 via, e.g., a bus.

In some embodiments, the feature extraction engine 320 may group the content activities 315 by identifiers of the plurality of content items 145. Based on the grouped content activities 315, feature vectors 325 may be extracted and/or generated for each content item based on the content activities between each content item with the user device 105 and/or agent device 110. In some embodiments, the features may include attributes regarding user interactions with each content item such as, e.g., time since a most recent content activity, most common location associated with content activity, type of each content item, most common type of content item, statistical metrics associated with activity activities 315 associated with each content item, such as, e.g., frequency of content activity, frequency of each type of content item, average quantity/amount/value associated with the content item, average quantity/amount/value associated with of each type of content items, median quantity/amount/value associated with the content item, median quantity/amount/value associated with of each type of content item, maximum quantity/amount/value associated with content activity, maximum quantity/amount/value associated with of each type of content item, minimum quantity/amount/value associated with content activities, minimum quantity/amount/value associated with of each type of content item, among other activity-related features for each content item or any combination thereof.

In some embodiments, the feature extraction engine 320 may also use the content activities 315 to determine features associated with the user device 105 and/or agent device 110, such as, e.g., a likely future location, a likely future behavior, among other features. For example, the feature extraction engine 320 may analyze the content activities 315 to identify travel plans based on, e.g., purchases of flight tickets or a hotel booking, web browsing data on a travel site, a social media subscription or notification preference for a particular travel locale or other activity or any combination thereof. Such future travel and/or future location may be used to influence the relevant content items.

In some embodiments, the features may be encoded in one or more feature vectors 325. For example, a feature vector 325 may include structured data recording values for each feature. In some embodiments, a first feature vector 325 for activity-related features associated with each content item may be generated and a second feature vector 325 may be used for user-related features including, e.g., location, future location, etc. In some embodiments, the first and second feature vectors 325 may concatenated into a single feature vector 325.

In some embodiments, to determine the relevance of each content item based on each feature vector 325, the content selection service 135 may include computer engines including, e.g., a content relevancy model engine 330. In some embodiments, in order to implement the content relevancy model engine 330, the content relevancy model engine 330 may include dedicated and/or shared software components, hardware components, or a combination thereof. For example, the content relevancy model engine 330 may include a dedicated processor and storage. However, in some embodiments, the content relevancy model engine 330 may share hardware resources, including the processor 125 and memory 130 of the authentication system 120 via, e.g., a bus.

In some embodiments, the content relevancy model engine 330 may ingest the feature vector(s) 325 and utilize a content relevancy ML model 335 to predict a degree of relevance of each content item for the user device 105 and the agent device 110 based on the feature vector(s) 325. In some embodiments, relevancy of each content item may be predicted individually based on one or more feature vector(s) 325 corresponding to each content item.

In some embodiments, the content relevancy ML model 335 may be developed and/or configured utilizing one or more exemplary AI/machine learning techniques chosen from, but not limited to, decision trees, boosting, support-vector machines, neural networks, nearest neighbor algorithms, Naive Bayes, bagging, random forests, and the like. For example, in some embodiments, the content relevancy ML model 335 may employ a clustering algorithm to cluster all known content items (e.g., for all content items 145 for which content items records exist in the library of content items in the datastore 140), or for all content items 145 with which the user device 105 and/or agent device 110 has logged content activities 315, or a combination thereof. The clustering may be performed based on the features of the content activities 315 and/or the attributes representing characteristics of each data entry or any combination thereof. All content items within a predetermined distance threshold may be identified for caching in a content items cache of the datastore 140. In some embodiments, the clustering may be performed on a filtered set of the plurality of content items 225, such as content items transmitted to locations within a defined geographic area, for agents associated with certain operating hours or contact hours, or other suitable filtering parameter or any combination thereof.

For example, the clustering may be performed based on a clustering of transaction activities to infer relevance to the user device 105 and/or the agent device 110 based on transactions, and thus a likelihood to exchange communications. Alternatively, or in addition, a clustering of prior communications may be performed to directly infer a likelihood of exchanging communications.

In some embodiments and, optionally, in combination of any embodiment described above or below, a neutral network technique may be employed to infer relevance based on the content activities 315. Thus, a supervised or semi-supervised learning scheme may be employed to correlate the content activities 315 for relevance to communications. In some embodiments, the neural network technique may employ one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Accordingly, in some embodiments, based on a trained classifier and/or regression layer of the content relevancy ML model 335, the content relevancy model engine 330 may produce, for each content item, a value indicative of a degree of relevance of the plurality of content items 145 to the user device 105 and the agent device 110. In some embodiments, the content relevancy ML model 335 may include, e.g., a classifier model, and thus may include a classifier layer having parameters trained to produce a probability value indicative of a probability associated with one or more labels based on the attributes encoded in the feature vector(s) 325. In some embodiments, the parameters may include learned parameters, such as learned node weights or other suitable learned parameters. For such a classifier model, an output layer of the content relevancy ML model 335 may decode the probability value(s) to apply a label indicative of a degree of relevance of each content item. For example, the output layer may be configured for single class classification where the output layer determines a label including, e.g., "relevant", where a probability value(s) not indicative of a label of "relevant" would be labeled as "not relevant". In some embodiments, the output layer may be configured for a multi-class classification with labels for, e.g., "high relevance", "medium relevance", "low relevance", "no relevance", or any other suitable scale of relevance.

In some embodiments, the output layer may apply a label of "relevant" or "not relevant" based on a comparison of the probability value of each content item. For example, the output layer may identify the highest-ranking set of the plurality of content items 225 and content items 230 as relevant content items based on a ranking of the associated probability values. In some embodiments, the highest-ranking set may include, e.g., a top 5, 10, 20, 30, 40, 50, 60, 70, 80, 90, 100, 200, 250, 300, or more content items in a list ordered according to magnitude of probability value, or any other suitable number of content items in a range from 1 to 1000. In some embodiments, the highest-ranking set may include content items having a probability value in a highest percentile set, such as, e.g., $75^{th}$ percentile, $80^{th}$ percentile, $85^{th}$ percentile, $90^{th}$ percentile, $95^{th}$ percentile, $96^{th}$ percentile, $97^{th}$ percentile, $98^{th}$ percentile, $99^{th}$ percentile, or any other suitable percentile. Any other suitable technique for identifying the most relevant content items may be employed.

In some embodiments, the set of the plurality of content items 225 may be provided to the authentication API to send to the agent device 110. In some embodiments, the subset of the plurality of content items 230 may be provided to the authentication API to send to the user device 105. In some embodiments, the set of the plurality of content items 225 may include a list of the content items 230 for the user device 105. The authentication API may use the list to identify (e.g., query the datastore 140) content items for the user device 105 and the agent device 110. In some embodiments, the plurality of content items 145 may be cataloged in a library of content items. Thus, the authentication API may access (e.g., in the datastore 140) from the library of content items, the set of the plurality of content items 225 associated with the user device 105 and the agent device 110.

In some embodiments, the authentication API may receive the set of the plurality of content items 225 and generate at least one message to communicate the set of the plurality of content items 225 to the user device 105 and the agent device 110. In some embodiments, delivering the set of the plurality of content items 225 may result in excess network resources being used to communicate duplicative data, in an ever-growing set of the plurality of content items 225 that are cached on the user device 105 and/or in the caching of duplicate content items. Accordingly, the authentication API may determine whether or not each content item is already cached ("pre-cached") in the cache of the user device 105.

In some embodiments, the authentication API may identify the user device 105 and the agent device 110 that have data pre-cached content items. In some embodiments, to reduce the use of network resources, the datastore 140 may maintain a parallel list of pre-cached content items in the user device 105 and the agent device 110. In some embodiments, the list of pre-cached content items may be updated each time the authentication API receives a set of records of the relevant content items (e.g., in response to each authentication request 205).

In some embodiments, using the list, whether accessed via the datastore 140 or received from the user device 105 and the agent device 110, the authentication API may compare the pre-cached content items to the relevant content items. Content items that are on the list of pre-cached content items may be identified as relevant pre-cached content items, while content items that are pre-cached and not among the relevant content items may be identified as pre-cached non-relevant content items and content items that are not pre-cached but are among the relevant content items may be identified as un-cached relevant content items.

In some embodiments, in order to ensure efficient use of storage resources of the user device 105, only relevant content items may be maintained in the cache of the user device 105 and the agent device 110. Thus, non-relevant content items may be removed. Accordingly, in some embodiments, the authentication API may generate a message to deliver the plurality of content items 145 of the relevant un-cached content items, a record cache instruction to cache the plurality of content items 145 of the relevant un-cached content items, and/or a removal instruction to delete or otherwise remove the plurality of content items 145 of the non-relevant pre-cached content items. Thus, non-relevant content items may be removed, relevant pre-cached content items data may be maintained, and relevant un-cached content items may be delivered to update the cache of the user device 105 and the agent device 110. Accordingly, the plurality of content items 145 in the cache may be intelligently updated to provide a cache of content items that are likely to be shown to the user device 105 and the agent device 110, thus enabling the content selection service 135 to efficiently provide access so the plurality of content items 145 using local data.

In some embodiments, the content selection service 135 may also send requests in real-time to the datastore 140 for content items data in response to an authentication request 205 being received from an agent device 110 for which the plurality of content items 145 are not cached in the datastore 140. Thus, the content selection service 135 may include a fallback in the case that the agent device 110 does not include the plurality of content items associated with the user device 105. Such a fallback may require network communication to the datastore 140, and thus incur a delay or lag between receiving the authentication request 205 and display on the user interface 115 of the set of the plurality of content items 225. Alternatively, or in addition, the authentication system 120 may omit utilizing the content selection service 135 for authentication requests 205 from any agent device 110 for whom content items are not cached in the datastore 140, and instead may immediately transmit randomized content items to the agent device 110 and a subset of that randomized set to the user device 105.

In some embodiments, the content relevancy model engine 330 may utilize the content relevancy ML model 335 to predict content items relevant to the user device 105 and/or agent device 110, e.g., based on content activities 315. In some embodiments, the content relevancy ML model 335 may include, e.g., a classifier machine learning model to classify content items as relevant or non-relevant based on an associated feature vector 325. In some embodiments, the content relevancy ML model 335 may be pretrained for general applicability, and then tailored to a particular user based on user feedback into the content relevancy model engine 330.

In some embodiments, the content relevancy ML model 335 may ingest a particular feature vector 325 that encodes features representative of activity attributes characterizing content activities 315 that the user device 105 and/or agent device 110 has viewed relative to a particular content item. In some embodiments, the content relevancy ML model 335 may process the feature vector 325 with parameters to produce a prediction of content items. In some embodiments, the parameters of the content relevancy ML model 335 may form a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the content relevancy ML model 335 may advantageously include a random forest classification model.

In some embodiments, the content relevancy ML model 335 may process the features encoded in the feature vector 325 by applying the parameters of the classification model to produce a model output vector. In some embodiments, the model output vector may be decoded to generate one or more labels indicative of relevant content items. In some embodiments, the model output vector may include or may be decoded to reveal a numerical output, e.g., one or more probability values between 0 and 1 where each probability value indicates a degree of probability that a particular label correctly classifies the feature vectors 325. In some embodiments, the degree of probability may be interpreted as a degree of relevancy whereby the probability that a particular content item is relevant corresponds to the degree to which the particular content item is relevant. In some embodiments, a regression model may be used instead of a classification model to explicitly predict a degree of relevancy. Such a regression model may be similarly pre-trained and tailored using feature vectors 325.

In some embodiments, the content relevancy ML model 335 may test each probability value against a respective probability threshold. In some embodiments, each probability value has an independently learned and/or configured probability threshold. Alternatively, or additionally, in some embodiments, one or more of the probability values of the model output vector may share a common probability threshold. In some embodiments, where a probability value is greater than the corresponding probability threshold, the feature vectors 325 is labeled according to the corresponding label. For example, the probability threshold may be, e.g., greater than 0.5, greater than 0.6, greater than 0.7, greater than 0.8, greater than 0.9, or other suitable threshold value. Therefore, in some embodiments, the content relevancy ML model 335 may produce the plurality of content items 145 for a particular feature vector based on the probability value(s) of the model output vector and the probability threshold(s).

In some embodiments, the parameters of the content relevancy ML model 335 may be trained based on known outputs, e.g., for initial training for general applicability or specifically for the user. For example, the feature vectors 325 may be paired with a target classification or known classification to form a training pair, such as a historical feature vectors 325 and an observed result and/or human annotated classification denoting whether the historical feature vectors 325 is associated with a relevant content item or a non-relevant content item. In some embodiments, the feature vectors 325 may be provided to the content relevancy ML model 335, e.g., encoded in a feature vector 325, to produce a predicted label. In some embodiments, the content relevancy ML model 335 may then compare the predicted label with the known output of a training pair including the historical feature vectors 325 to determine an error of the predicted label. In some embodiments, the content relevancy ML model 335 may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the content relevancy ML model 335 produces the prediction, such as in online learning scenarios. In such a scenario, the content relevancy ML model 335 may receive the feature vectors 325 and generate the model output vector to produce a label classifying the feature vectors 325. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the feature vectors 325 to form the training pair and the content relevancy model engine 330 may determine an error of the predicted label using the feedback.

In some embodiments, based on the error, the content relevancy model engine 330 may update the parameters of the content relevancy ML model 335 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the content relevancy model engine 330 may update the parameters of the content relevancy ML model 335 based on the error of predicted labels to train the content relevancy ML model 335 to model the correlation between feature vectors 325 and records of the relevant content items to produce more accurate labels of feature vectors 325.

In some embodiments, each feature vector 325 this is classified as relevant may result in the associated content items being classified as the relevant content items. The relevant content items may be provided to the user device 105 as described above with reference to FIGS. 1 and 2. In some embodiments, the relevant content items responsive to the authentication request 205 may be the set of the plurality of content items 225 displayed by the agent device 110 in the user interface 115 and the content items 230 transmitted to the user device 105. In some embodiments, the content relevancy model engine 330 may include a depiction or representation of, e.g., the content item upon delivery to the user device 105 and/or agent device 110. In some embodiments, the content relevancy model engine 330 may receive an indication confirm or deny that the plurality of content items 145 are relevant. For example, the content relevancy model engine 330 may receive feedback from the user as input with an option that may confirm whether the relevant content items are relevant or indicates that the plurality of content items are incorrect. In some embodiments, the feedback may include a determination of match 240 or mismatch 270 relative to the plurality of content items 145.

In some embodiments, the feedback may indicate one or more relevancy metrics associated with content items and exchanged communications between the user device 105 and the agent device 110. In some embodiments, the content relevancy model engine 330 may track communication metrics, such as, e.g., a time and/or date at which a communication is exchanged, communication data for each communication exchanged (e.g., the originating phone number, user profile identifier, social media handle, email address, etc.), a location of the user device 105 and the agent device 110 when a communication is exchanged, among other metrics or any combination thereof.

The communication metrics may be compared against relevancy of content items, such as, the plurality of content items 145 cached in the content item cache of the datastore 140, content items added as relevant to the content item cache, content item records removed as irrelevant from the content item cache, content item that are unchanged as to predicted relevance, among other relevancy statuses or any combination thereof. Based on the communication metrics and the predicted relevancy of each communication exchanged, of each cached content item, or each removed content item, or any combination thereof, relevancy metrics may be determined by the relevancy model engine 330.

The relevancy metrics may include, e.g., a number and/or frequency of such content item previously provided to the user device 105 and the agent device 110, a list and/or number of content items with which communications were exchanged but were not identified as relevant content item, a label or flag for each relevant content item for which communications were not exchanged, a label or flag for each relevant content item for which communications were not exchanged within a predetermined period of time, an amount of time from caching each relevant content item and exchanging communications with the plurality of content items 145, a label or flag for each relevant content item for which communications were exchanged, a label or flag for each relevant content item for which communications were exchanged within the predetermined period of time, among other relevancy metrics.

In some embodiments, the content relevancy model engine 330 may determine the relevancy metrics. In some embodiments, the content relevancy model engine 330 may upload the communication metrics and/or relevancy to the datastore 140, or both. In some embodiments, the content relevancy model engine 330 may determine the relevancy metrics, or by any other suitable local, remote and/or hybrid processing scheme. In some embodiments, the feedback including the relevancy metrics may be used by the content relevancy model engine 330 to determine whether the prediction of each relevant content item is correct based on whether the plurality of content items 145 should actually be transmitted. Thus, the relevancy metrics may enable the content relevancy model engine 330 to determine error in model predictions for training the content relevancy ML model 335.

In some embodiments, the amount of relevant content items may include a number that would be infeasible for the user to explicitly confirm and/or deny relevancy of each. Rather, the feedback may include an indication of each relevant content item that was used for authentication, e.g., previously displayed by the user device 105 and/or the user interface 115 by the agent device 110.

In some embodiments, in the case of a particular relevant content item being used, the feedback may be determined to be positive feedback that the particular record of the content item is indeed relevant. Similarly, in the case of the content item not being used, the feedback may include negative feedback that the content item is not relevant. In some embodiments, the probability that each content item is actually used for any given authentication is low. Thus, negative feedback for each content item may be greater than positive feedback. Accordingly, negative feedback may be weighted lower than positive feedback by the content relevancy model engine 330 for training purposes. For example, the negative feedback may be weighted lower than the positive feedback by, e.g., a factor of 10, 100, 1000, or another factor.

In some embodiments, the feedback may be returned to the content relevancy model engine 330, e.g., at regular intervals (e.g., matching intervals at which each authentication request 205 is received), or upon each authentication by the content selection service 135, or any suitable combination thereof. For example, at each interval of the regular intervals, the feedback may include a record of the number of times the content item was used. In an example of feedback upon each communication, the feedback may include an indication of the content item associated with each authentication (e.g., displayed to the agent device 110 and/or the user device 105).

In some embodiments, the content relevancy model engine 330 may be trained based on relevant content item and the feedback. Based on the difference between the content item and the feedback, the parameters of the classification model of the content relevancy ML model 335 may be updated to improve the accuracy of identifying content item as relevant or non-relevant for authentication (e.g., displayed to the agent device 110 and/or the user device 105).

In some embodiments, training is performed using the content relevancy model engine 330. In some embodiments, the relevant content items fed back to the content relevancy model engine 330. The content relevancy model engine 330 may also ingest the feedback, such as feedback described above. As described above, in some embodiments, the content relevancy model engine 330 may employ a loss function, such as, e.g., Hinge Loss, Multi-class SVM Loss, Cross Entropy Loss, Negative Log Likelihood, or other suitable classification loss function. The loss function determines an error based on the feedback and the plurality of content items 145. In some embodiments, the content relevancy model engine 330 may, e.g., backpropagate the error to the content relevancy ML model 335 to update the parameters using, e.g., gradient descent, heuristic, convergence or other optimization techniques and combinations thereof.

In some embodiments, the content relevancy model engine 330 may therefore train the parameters of the content relevancy ML model 335 to select content items 225 and content items 230 that are relevant for authenticating the agent device 110 based on feedback such as whether there is a match 240 or a mismatch 270 between based on the plurality of content items 145. As a result, the content relevancy ML model 335 may be continually trained and optimized by the content relevancy model engine 330 based on user feedback.

Figure 4:
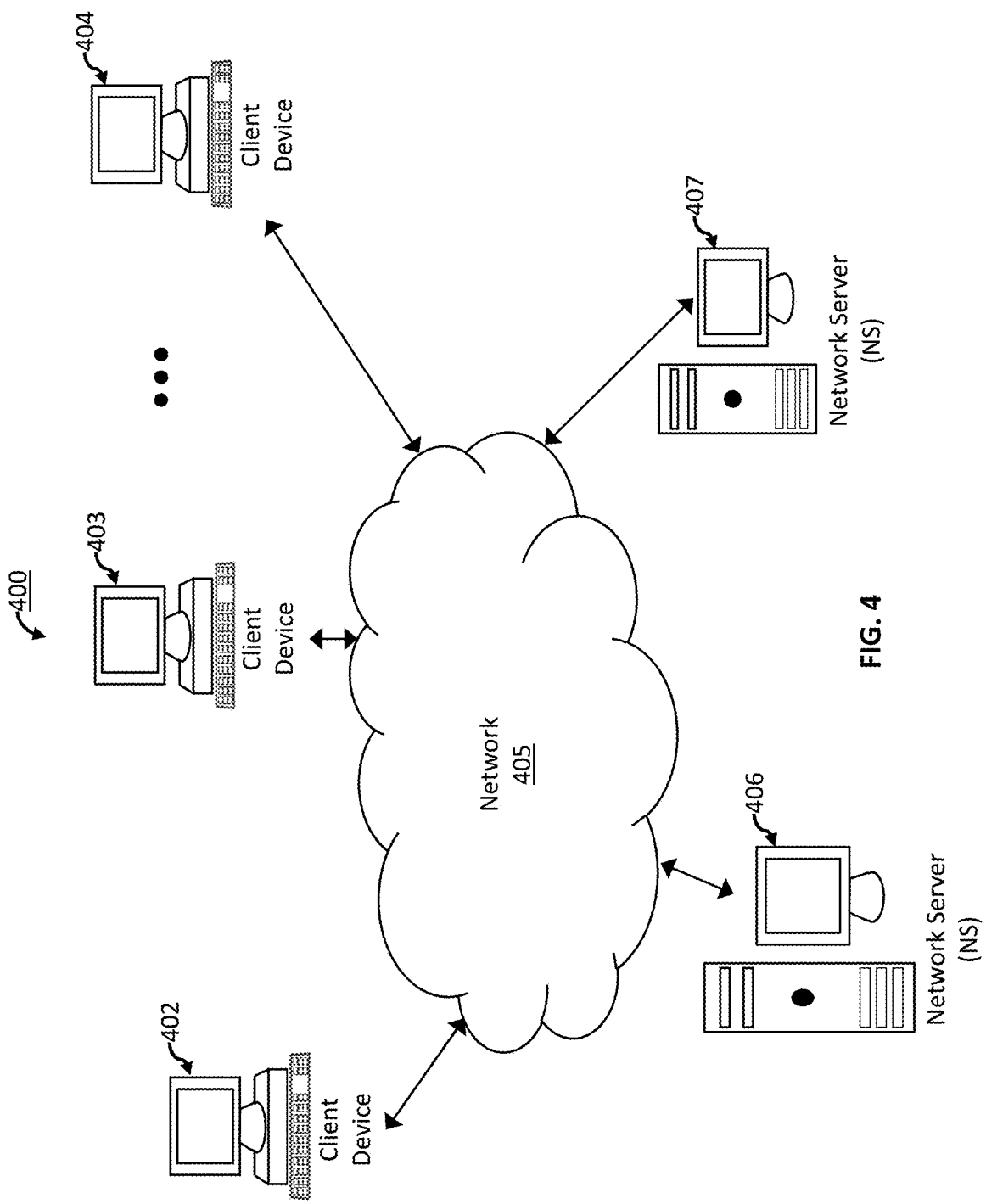
FIG. 4 depicts a block diagram of an exemplary computer-based system and platform for content selections for securing communications between agent devices and user devices in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, Wi-Fi, WiMAX, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as Hypertext Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications may be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBec, 3G, 4G, 5G, GSM, GPRS, Wi-Fi, WiMAX, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 402-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
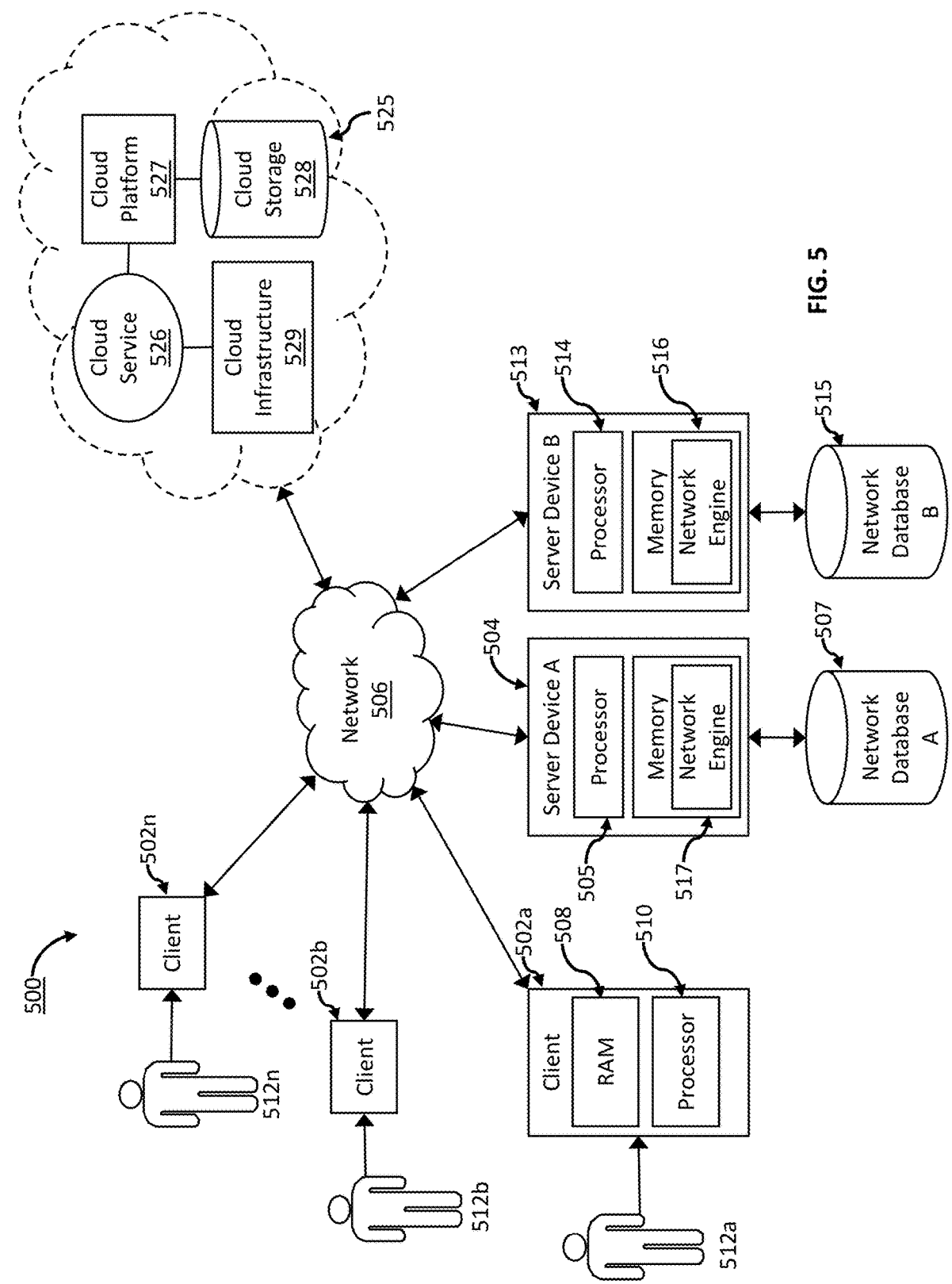
FIG. 5 depicts a block diagram of an exemplary computer-based system and platform for content selections for securing communications between agent devices and user devices in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device/client 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
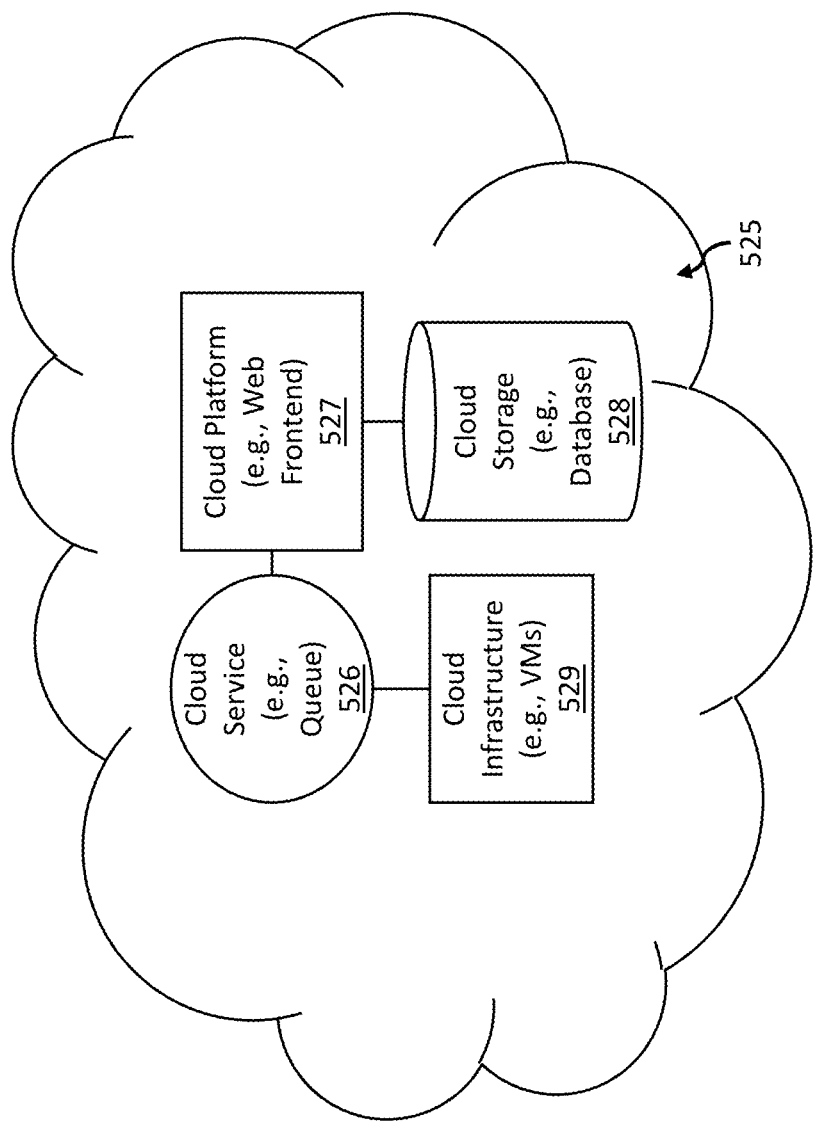
FIG. 6 depicts a block diagram of another exemplary computer-based system and platform for content selections for securing communications between agent devices and user devices in accordance with one or more embodiments of the present disclosure.
Figure 7:
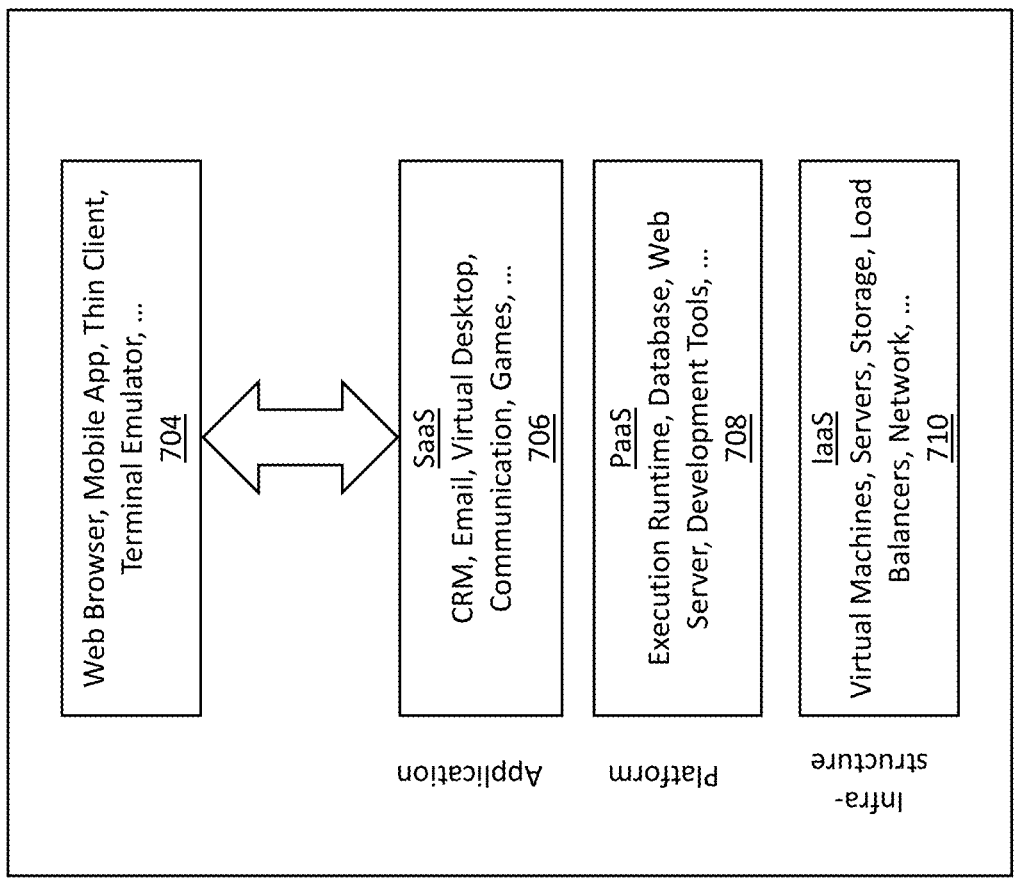
FIG. 7 depicts illustrative schematics of another exemplary implementation of the cloud computing/architecture(s) in which embodiments of a system for content selections for securing communications between agent devices and user devices may be specifically configured to operate in accordance with some embodiments of the present disclosure.

In some embodiments, as shown in FIG. 6, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: a cloud service 526 (e.g., Queue), a cloud platform 527 (e.g., Web frontend), a cloud storage 528 (e.g., Database), and a cloud infrastructure 529 (e.g., VMs). In some embodiments, as illustrated by FIG. 7, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIG. 7 illustrates schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, Wi-Fi, WiMAX, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that may be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; Wi-Fi™ server location data; Bluetooth™ based location data; triangulation such as, but not limited to, network based triangulation, Wi-Fi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

The aforementioned examples are, of course, illustrative, and not restrictive.

At least some aspects of the present disclosure will now be described with reference to the following numbered clauses.

Clause 1. A method including:
  receiving, by at least one processor, an authentication request between an agent and a user device;
    wherein the authentication request includes at least one characteristic associated with the user device;

determining, by the at least one processor, a user record associated with the user device based on the at least one characteristic;

obtaining, by the at least one processor, a plurality of content items for authenticating the agent device for the user device with the user record;

determining, by the at least one processor, a set of the plurality of content items based on the plurality of content items for display to the agent device for authenticating the agent device for the user device with the user record;

transmitting, by the at least one processor, a subset of the set of the plurality of content items to the user device associated with the user record;

receiving, by the at least one processor, from the agent device, at least one selected content item identified by at least one content item selection;

determining, by the at least one processor, a match between the at least one selected content item and the subset of the set of the plurality of content items transmitted to the user device; and transmitting, by the at least one processor, responsive to the match, a communication with a predetermined type data request for the user device to satisfy the authentication request.

Clause 2. A system including:

at least one processor configured to execute software instructions that cause the at least one processor to perform steps to:

receive an authentication request between an agent device and a user device;
wherein the authentication request includes at least one characteristic associated with the user device;

determine a user record associated with the user device based on the at least one characteristic;

determine a set of a plurality of content items based on the plurality of content items for display to the agent device for authenticating the agent device for the user device with the user record;

transmit a subset of the set of the plurality of content items to the user device associated with the user record;

receive, from the agent device, at least one selected content item identified by at least one content item selection;

determine a match between the at least one selected content item and the subset of the set of the plurality of content items transmitted to the user device; and transmit responsive to the match, a communication with a predetermined type data request for the user device to satisfy the authentication request.

Clause 3. At least one computer-readable storage medium having encoded thereon software instructions that, when executed by at least one processor, cause the at least one processor to perform steps to:

receive an authentication request between an agent device and a user device;
wherein the authentication request includes at least one characteristic associated with the user device;

determine a user record associated with the user device based on the at least one characteristic;

determine a set of a plurality of content items based on the plurality of content items for display to the agent device for authenticating the agent device for the user device with the user record;

transmit a subset of the set of the plurality of content items to the user device associated with the user record;

receive, from the agent device, at least one selected content item identified by at least one content item selection;

determine a match between the at least one selected content item and the subset of the set of the plurality of content items transmitted to the user device; and transmit, responsive to the match, a communication with a predetermined type data request for the user device to satisfy the authentication request.

Clause 4. The system, method, and/or computer-readable storage medium of any of clauses 1, 2, and/or 3, wherein the plurality of content items comprises images, text strings, graphical icons, or any combination thereof.

Clause 5. The system, method, and/or computer-readable storage medium of any of clauses 1, 2, and/or 3, further including:

determining, based on the user record and an agent record of the agent device, the set of the plurality of content items for authenticating the agent device.

Clause 6. The system, method, and/or computer-readable storage medium of any of clauses 1, 2, and/or 3, wherein the agent device receiving the at least one content item selection from the user device comprises:

determining, based on the user record and an agent record of the agent device, the subset of the plurality of content items for transmitting to the user device.

Clause 7. The system, method, and/or computer-readable storage medium of any of clauses 1, 2, and/or 3, wherein receiving the at least one selected content item identified by the at least one content item selection further comprises:

causing the set of the plurality of content items based on the plurality of content items to be displayed by the agent device in a user interface; and detecting the at least one selected content item identified by the at least one content item selection from at least one interaction with the user interface displaying the set of the plurality of content items to the agent device.

Clause 8. The system, method, and/or computer-readable storage medium of any of clauses 1, 2, and/or 3, further including:

determining a mismatch between the at least selected content item and the subset of the set of the plurality of content items transmitted to the user device; and transmitting, responsive to the mismatch, a notification to the user device.

Clause 9. The system, method, and/or computer-readable storage medium of any of clauses 1, 2, and/or 3, further including:

receiving a transmission from the user device, the transmission comprises predetermined type data to satisfy the predetermined type data request.

While one or more embodiments of the present disclosure have been described, it is understood that these embodiments are illustrative only, and not restrictive, and that many modifications may become apparent to those of ordinary skill in the art, including those various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:
1. A method comprising:
receiving, by at least one processor, an authentication request between an agent device and a user device;

wherein the authentication request includes at least one characteristic associated with the user device;
determining, by the at least one processor, a user record associated with the user device based on the at least one characteristic;
obtaining, by the at least one processor, a plurality of content items for authenticating the agent device for the user device with the user record;
determining, by the at least one processor, based on both the user record and an agent record of the agent device, a set of the plurality of content items for display to the agent device for authenticating the agent device for the user device with the user record;
   wherein the set of the plurality of content items is not known to the agent device prior to the authentication request;
transmitting, by the at least one processor, a subset of the set of the plurality of content items to the user device associated with the user record;
receiving, by the at least one processor, from the agent device, at least one selected content item identified by at least one content item selection;
determining, by the at least one processor, a match between the at least one selected content item and the subset of the set of the plurality of content items transmitted to the user device; and
transmitting, by the at least one processor, responsive to the match, a communication with a predetermined type data request for the user device to satisfy the authentication request.

2. The method of claim 1, further comprising:
accessing, by the at least one processor, a datastore to obtain the plurality of content items that comprise images, text strings, graphical icons, or any combination thereof.

3. The method of claim 1, further comprising:
determining, by the at least one processor, based on the user record and an agent record of the agent device, the set of the plurality of content items for authenticating the agent device; and
determining, by the at least one processor, based on the user record and the agent record of the agent device, the subset of the plurality of content items for transmitting to the user device.

4. The method of claim 1, further comprising:
generating, by the at least one processor, at least one of the set of the plurality of content items based on at least one of the plurality of content items, wherein the at least one of the set of the plurality of content items differs from the at least one of the plurality of content items.

5. The method of claim 1, wherein receiving the at least one selected content item identified by the at least one content item selection further comprises:
causing, by the at least one processor, the set of the plurality of content items based on the plurality of content items to be displayed by the agent device in a user interface; and
detecting, by the at least one processor, the at least one selected content item identified by the at least one content item selection from at least one interaction with the user interface displaying the set of the plurality of content items to the agent device.

6. The method of claim 1, further comprising:
determining, by the at least one processor, a mismatch between the at least one selected content item and the subset of the set of the plurality of content items transmitted to the user device; and
transmitting, by the at least one processor, responsive to the mismatch, a notification to the user device.

7. The method of claim 1, further comprising:
receiving, by the at least one processor, a transmission from the user device, the transmission comprises predetermined type data to satisfy the predetermined type data request.

8. A system comprising:
a non-transient computer memory storing software instructions; and
at least one processor configured to execute the software instructions that cause the at least one processor to:
receive an authentication request between an agent device and a user device;
   wherein the authentication request includes at least one characteristic associated with the user device;
determine a user record associated with the user device based on the at least one characteristic;
determine, based on both the user record and an agent record of the agent device, a set of the plurality of content items for display to the agent device for authenticating the agent device for the user device with the user record;
wherein the set of the plurality of content items is not known to the agent device prior to the authentication request;
transmit a subset of the set of the plurality of content items to the user device associated with the user record;
receive, from the agent device, at least one selected content item identified by at least one content item selection;
determine a match between the at least one selected content item received from the agent device and the subset of the set of the plurality of content items transmitted to the user device; and
transmit responsive to the match, a communication with a predetermined type data request for the user device to satisfy the authentication request.

9. The system of claim 8, wherein the at least one processor is further configured to execute the software instructions that cause the at least one processor to perform steps to:
access a datastore to obtain the plurality of content items that comprise images, text strings, graphical icons, or any combination thereof.

10. The system of claim 8, wherein the at least one processor is further configured to execute the software instructions that cause the at least one processor to perform steps to:
determine, based on the user record and an agent record of the agent device, the set of the plurality of content items for authenticating the agent device; and
determine, based on the user record and the agent record of the agent device, the subset of the plurality of content items for transmitting to the user device.

11. The system of claim 8, wherein the at least one processor is further configured to execute the software instructions that cause the at least one processor to perform steps to:
generate at least one of the set of the plurality of content items based on at least one of the plurality of content items, wherein the at least one of the set of the plurality of content items differs from the at least one of the plurality of content items.

12. The system of claim 8, wherein to receive the at least one selected content item identified by the at least one content item selection, the at least one processor is further configured to execute the software instructions that cause the at least one processor to perform steps to:
    cause the set of the plurality of content items based on the plurality of content items to be displayed by the agent device in a user interface; and
    detect the at least one selected content item identified by the at least one content item selection from at least one interaction with the user interface displaying the set of the plurality of content items to the agent device.

13. The system of claim 8, wherein the at least one processor is further configured to execute the software instructions that cause the at least one processor to perform steps to:
    determine a mismatch between the at least one selected content item and the subset of the set of the plurality of content items transmitted to the user device; and
    transmit, responsive to the mismatch, a notification to the user device.

14. The system of claim 8, wherein the at least one processor is further configured to execute the software instructions that cause the at least one processor to perform steps to:
    receive a transmission from the user device, the transmission comprising predetermined type data to satisfy the predetermined type data request.

15. At least one non-transitory computer-readable storage medium storing software instructions that, when executed by at least one processor, cause the at least one processor to perform steps to:
    receive an authentication request between an agent device and a user device;
        wherein the authentication request includes at least one characteristic associated with the user device;
    determine a user record associated with the user device based on the at least one characteristic;
    determine, based on both the user record and an agent record of the agent device, a set of the plurality of content items for display to the agent device for authenticating the agent device for the user device with the user record;
    wherein the set of the plurality of content items is not known to the agent device prior to the authentication request;
    transmit a subset of the set of the plurality of content items to the user device associated with the user record;
    receive, from the agent device, at least one selected content item identified by at least one content item selection;
    determine a match between the at least one selected content item received from the agent device and the subset of the set of the plurality of content items transmitted to the user device; and
    transmit, responsive to the match, a communication with a predetermined type data request for the user device to satisfy the authentication request.

16. The at least one computer-readable storage medium of claim 15, wherein the software instructions are further configured to cause the at least one processor to perform steps to:
    access a datastore to obtain the plurality of content items that comprise images, text strings, graphical icons, or any combination thereof.

17. The at least one computer-readable storage medium of claim 15, wherein the software instructions are further configured to cause the at least one processor to perform steps to:
    determine, based on the user record and an agent record of the agent device, the set of the plurality of content items for authenticating the agent device; and
    determine, based on the user record and the agent record of the agent device, the subset of the plurality of content items for transmitting to the user device.

18. The at least one computer-readable storage medium of claim 15, wherein to receive the at least one selected content item identified by the at least one content item selection, the at least one processor is further configured to execute the software instructions that cause the at least one processor to perform steps to:
    cause the set of the plurality of content items based on the plurality of content items to be displayed by the agent device in a user interface; and
    detect the at least one selected content item identified by the at least one content item selection from at least one interaction with the user interface displaying the set of the plurality of content items to the agent device.

19. The at least one computer-readable storage medium of claim 15, wherein the software instructions are further configured to cause the at least one processor to perform steps to:
    determine a mismatch between the at least one selected content item and the subset of the set of the plurality of content items transmitted to the user device; and
    transmit responsive to the mismatch, a notification to the user device.

20. The at least one computer-readable storage medium of claim 15, wherein the software instructions are further configured to cause the at least one processor to perform steps to:
    generate at least one of the set of the plurality of content items based on at least one of the plurality of content items, wherein the at least one of the set of the plurality of content items differs from the at least one of the plurality of content items.

\* \* \* \* \*